US009772411B2

(12) United States Patent
Walker et al.

(10) Patent No.: US 9,772,411 B2
(45) Date of Patent: Sep. 26, 2017

(54) METHOD AND APPARATUS FOR NEUTRON DETECTION UTILIZING PULSE HEIGHT DISCRIMINATION AND PULSE SHAPE DISCRIMINATION

(71) Applicant: NANOPTICS, INCORPORATED, Gainesville, FL (US)

(72) Inventors: James K. Walker, Gainesville, FL (US); Youngwook Noh, Gainesville, FL (US); Richard T. Farley, Gainesville, FL (US)

(73) Assignee: NANOPTICS, INCORPORATED, Gainesville, FL (US)

( * ) Notice: Subject to any disclaimer, the term of this patent is extended or adjusted under 35 U.S.C. 154(b) by 1193 days.

(21) Appl. No.: 14/055,355

(22) Filed: Oct. 16, 2013

(65) Prior Publication Data

US 2016/0356900 A1 Dec. 8, 2016

Related U.S. Application Data

(60) Provisional application No. 61/768,495, filed on Feb. 24, 2013, provisional application No. 61/755,661, (Continued)

(51) Int. Cl.
*G01T 1/20* (2006.01)
*G01T 3/06* (2006.01)
(Continued)

(52) U.S. Cl.
CPC .............. *G01T 3/06* (2013.01); *C09K 11/00* (2013.01); *C09K 11/025* (2013.01); *C09K 11/06* (2013.01);
(Continued)

(58) Field of Classification Search
CPC ......... F21K 2/00; G02B 5/003; C09B 69/008; C09B 50/00; C09B 50/04; C09B 5/62;
(Continued)

(56) References Cited

U.S. PATENT DOCUMENTS 3,010,908 A 11/1961 Broderick et al.
3,960,756 A 6/1976 Noakes
(Continued)

FOREIGN PATENT DOCUMENTS

EP 0 606 732 7/1994
WO WO-2012/142365 10/2012
WO WO-2013/003802 1/2013

OTHER PUBLICATIONS

Benniston, A.C., et al., "Intramolecular Excimer Formation and Delayed Fluorescence in Sterically Contrained Pyrene Dimers," *Chemistry: A European Journal*, May 2007, vol. 13, No. 16, pp. 4665-4674.
(Continued)

*Primary Examiner* — David J Makiya
*Assistant Examiner* — Taeho Jo
(74) *Attorney, Agent, or Firm* — Saliwanchik, Lloyd & Eisenschenk (57) ABSTRACT

Embodiments relate to an advanced fast and thermal neutron detector material composition with the properties useful for Special Nuclear Material (SNM) detection. Specific embodiments of the material composition result in two excimer scintillation light production mechanisms that provide two corresponding independent techniques for gamma discrimination; namely Pulse Shape Discrimination and Pulse Height Discrimination. A dual discrimination method, Pulse Shape and Pulse Height Discrimination (PSHD), can be implemented relying on both pulse height discrimination
(Continued)

Figure 3. Normalized scintillation pulse shape distribution including effect of inter-dimer TTA.

and pulse shape discrimination, and can allow the operation of large area, fast and thermal neutron detectors.

20 Claims, 4 Drawing Sheets

Related U.S. Application Data filed on Jan. 23, 2013, provisional application No. 61/714,588, filed on Oct. 16, 2012.

(51) Int. Cl.
    C09K 11/00      (2006.01)
    C09K 11/06      (2006.01)
    C09K 11/02      (2006.01)
    G01T 1/203      (2006.01)
    G21K 4/00       (2006.01)

(52) U.S. Cl.
    CPC .... *G01T 1/2033* (2013.01); *C09K 2211/1007* (2013.01); *C09K 2211/1011* (2013.01); *G21K 4/00* (2013.01)

(58) Field of Classification Search
    CPC ...... C09B 67/0033; G01T 1/203; G21K 4/00; G21K 5/00
    USPC .................................................. 250/361 R
    See application file for complete search history.

(56) References Cited

U.S. PATENT DOCUMENTS

| | | | |
|---|---|---|---|
| 4,495,084 A | 1/1985 | Shimizu et al. | |
| 4,594,179 A | 6/1986 | Harrah et al. | |
| 5,110,500 A * | 5/1992 | Walker | G01T 1/203 252/301.16 |
| 5,298,189 A | 3/1994 | Kauffman | |
| 5,552,551 A * | 9/1996 | Schlenoff | C07D 311/30 546/155 |
| 5,606,638 A * | 2/1997 | Tymianski | G01T 1/203 250/368 |
| 2005/0249668 A1* | 11/2005 | Weissleder | A61K 49/0032 424/9.6 |
| 2006/0054863 A1* | 3/2006 | Dai | B82Y 10/00 252/301.4 R |
| 2007/0054343 A1* | 3/2007 | Sem | C12Q 1/485 435/15 |
| 2007/0054410 A1* | 3/2007 | Sem | C07D 311/82 436/120 |
| 2009/0294692 A1* | 12/2009 | Bourke, Jr. | A23L 3/26 250/459.1 |
| 2010/0016783 A1* | 1/2010 | Bourke, Jr. | A61K 41/0057 604/20 |
| 2010/0127177 A1* | 5/2010 | Schmitt | G01T 3/06 250/362 |
| 2010/0261263 A1* | 10/2010 | Vo-Dinh | A61L 2/08 435/287.1 |
| 2011/0021970 A1* | 1/2011 | Vo-Dinh | A61K 49/0039 604/20 |
| 2011/0108738 A1* | 5/2011 | Doty | C09K 11/06 250/459.1 |
| 2012/0161012 A1* | 6/2012 | Huston | G01T 1/2033 250/361 R |
| 2012/0241630 A1* | 9/2012 | Walker | G01T 1/2033 250/362 |
| 2013/0099125 A1* | 4/2013 | Grodzins | G01T 1/2008 250/362 |
| 2014/0027646 A1* | 1/2014 | Zaitseva | G01T 1/203 250/361 R |
| 2014/0224993 A1* | 8/2014 | Noh | G01T 3/06 250/362 |

OTHER PUBLICATIONS

Birks, J.B., *The Theory and Practice of Scintillation Counting*, Pergamon Press, 1964.
Bonne, C., et al., "Characterization of the Triplet-Triplet Annihilation Process of Pyrene and Several Derivatives under Laser Excitation," *Journal of the Americal Chemical Society*, May 1990, vol. 112, No. 11, pp. 4226-4231.
Brooks, F.D., et al., "Pulse Shape Discrimination in a Plastic Scintillator," *IRE Transactions on Nuclear Science*, 1960, vol. 7, Nos. 2-3, pp. 35-38.
Delaunay, "Neutron Detector Developments at LPC Caen," http://www.slidefinder.net/d/delaunay/delaunay/13688226.
Flaska, M., et al., "Digital Pulse Shape Analysis for the Capture-Gated Liquid Scintillator BC-523A," *Nuclear Instruments and Methods in Physics Research A*, Feb. 2009, vol. 599, Nos. 2-3, pp. 221-225.
Güsten, H., et al., "Photophysical Properties of Fluoranthene and Its Benzo Analogues," *Journal of Photochemistry*, 1982, vol. 18, No. 1, pp. 9-17.
Hull, G., et al., "New Organic Crystals for Pulse Shape Discrimination," *IEEE Transactions on Nuclear Science*, Jun. 2009, vol. 56, No. 3, pp. 899-903.
Knoll, G.F., *Radiation Detection and Measurement*, J. Wiley and Sons, 1998.
McKinsey, D.N., et al., "Fluorescence Efficiencies of Thin Scintillating Films in the Extreme Ultraviolet Spectral Region," *Nuclear Instruments and Methods in Physics Research B*, Nov. 1997, vol. 132, No. 3, pp. 351-550.
Newhouse, E. I. "Fractal-Like Energy Transport and Fusion in a Naphthalene-Doped Polymeric Glass" *Journal of Luminescence*, 1984, pp. 651-653, vol. 31 & 32.
Turro, N.J., et al., *Modern Molecular Photochemistry of Organic Molecules*, University Science Books, 2010.
Venditto, V. et al. "Orientation and Microenvironment of Naphthalene Guest in the Host Nanoporous Phase of Syndiotactic Polystyrene" *Macromolecules*, 2005, pp. 3696-3702, vol. 38.
Office Action dated Aug. 1, 2014 in U.S. Appl. No. 13/430,394.
Office Action dated Jul. 31, 2014 in U.S. Appl. No. 14/055,765.
Birks, J.B., "The Luminescence of Liquid Alkyl Benzenes Under High-Intensity Ionizing Irradiation," *Chemical Physics Letters*, Feb. 1970, vol. 4, No. 10, pp. 603-606.
D'Ambrosio, C., et al., "Particle Tracking with Scintillating Fibers," *IEEE Transactions on Nuclear Science*, Jun. 1996, vol. 43, No. 3, pp. 2115-2127.
De Vries, T.S., et al., "Lithium Phenolates Solvated by Tetrahydrofuran and 1,2-Dimethoxyethane: Structure Determination Using the Method of Continuous Variation," *Journal of the American Chemical Society*, Sep. 2009, vol. 131, No. 36, pp. 13142-13154.
Güsten, H., et al., "Organic Scintillators with Unusually Large Stokes' Shifts," *Journal of Physical Chemistry*, Feb. 1978, vol. 82, No. 4, pp. 459-463.
Runkle, R.C., et al., "Securing special nuclear material: Recent advances in neutron detection and their role in nonproliferation," *Journal of Applied Physics*, 2010, vol. 108, Article No. 111101.
Zaitseva, N., et al., "Plastic scintillators with efficient neutron/gamma pulse shape discrimination," *Nuclear Instruments and Methods in Physics Research A*, Mar. 2012, vol. 668, pp. 88-93.

\* cited by examiner

Figure 3. Normalized scintillation pulse shape distribution including effect of inter-dimer TTA.

S = monodentate solvent, ex. THF, Et$_2$O

S⌒S = chelating solvent, ex. DME, TMEDA

FIG. 6

LiCl: insoluble in toluene, benzene, stryene dissolved LiCl in THF proposed structure (may be tetramer etc.)

FIG. 7

METHOD AND APPARATUS FOR NEUTRON DETECTION UTILIZING PULSE HEIGHT DISCRIMINATION AND PULSE SHAPE DISCRIMINATION

CROSS-REFERENCE TO RELATED APPLICATIONS

The present application claims the benefit of U.S. Provisional Application Ser. No. 61/768,495, filed Feb. 24, 2013, U.S. Provisional Application Ser. No. 61/755,661, filed Jan. 23, 2013, and U.S. Provisional Application Ser. No. 61/714,588, filed Oct. 16, 2012, all of which are hereby incorporated by reference herein in their entirety, including any figures, tables, or drawings.

BACKGROUND OF INVENTION

Embodiments of the subject invention pertain to detection of radiation related to, for example, nuclear nonproliferation activities. The Office of Nuclear Nonproliferation Research and Development has been focused on enabling the development of next generation technical capabilities for radiation detection of nuclear materials. Recently, the Special Nuclear Material (SNM) Movement Detection Program created an evolving technology roadmap that identified the following fundamental objectives:
1. detect shielded highly enriched Uranium;
2. detect SNM at standoff distances; and
3. detect shielded weapon-grade plutonium.

General features of an advanced detection system able to meet the above objectives may include, but are not limited to the following:
1. a large area detector, e.g., at least several square meters;
2. capable of efficiently detecting and distinguishing fast neutrons, with gamma discrimination of at least 10,000:1 and preferably 100,000:1;
3. capable of efficiently detecting and distinguishing thermal neutrons, with gamma discrimination of at least 100,000:1 and preferably at least 1,000,000:1;
4. a nanosecond time resolution capability for neutron time of flight measurement, multiplicity measurements, as well as coincidence counting for active interrogation;
5. a segmented detector;
6. robust, moderate price, stable, safe, and easily field deployable.

There has been a major effort towards making a large area, efficient, fast neutron detector with good gamma discrimination. A recent review of methods of neutron detection is provided by Runkle R. C. et al., Journal of Applied Physics 108. 111101. (2010). There are many methods under investigation, yet none have appeared to come very close to meeting the challenging requirements.

Organic crystals, liquid scintillator, and specially designed plastic scintillator have been studied, (PCT Patent Application PCT/US2012/045094, published Jan. 3, 2013 under publication number WO 2013/003802, and "Plastic Scintillators with Efficient Neutron/Gamma Pulse Shape Discrimination", N. Zaitseva et al., Nuclear Instruments and Methods in Physics Research A 668(2012) 88-93). The different materials have been studied in small volume detectors and their gamma ray discrimination abilities are similar. The gamma ray discrimination is measured by the difference in scintillation pulse shape of interactions of neutron and gamma ray. This technique is known as Pulse Shape Discrimination (PSD). These types of material have been shown to have Figures of Merit (FOM) of 2.5 to 3.5, corresponding to gamma ray discrimination factors of about 1,000:1. In these small volume detector studies, the scintillation material has an efficient optical coupling to a Photo Multiplier Tube (PMT). In large area detectors, it is almost inevitable that loss of some scintillation light will result in a reduced gamma discrimination factor. Accordingly, it appears the gamma ray discrimination of these detectors is inadequate for effective detection of SNM. In general, the PSD method suffers from an inherent disadvantage; the pulse shape discrimination is effective only after a time delay, at which point the pulse height has fallen by at least an order of magnitude. As a result, there is a major loss of quantum statistical information when using PSD, which limits the ability to provide powerful gamma ray discrimination in large detectors.

Pacific Northwest National Laboratory (PNNL-15214) has evaluated the performance of a large area (0.7 m$^2$) twin sheet plastic scintillator time of flight (TOF) system for direct detection of fast neutrons. The TOF method yielded a gamma ray discrimination of at least 10,000:1, but only when the fast neutron intrinsic detection efficiency was limited to less than 4%. That detection efficiency is comparable to traditional moderator-based fast neutron detection systems (which have an intrinsic detection efficiency of 5 to 10% depending on the number of thermal neutron detectors), such as presently deployed in Radiation Portal Monitors (RPMs). This implies the TOF method would likely offer no improvement in the gross neutron counting sensitivity beyond that of existing RPMs. In addition, the intrinsic detection efficiency of up to 4% is inadequate to perform fast neutron multiplicity measurements, which are powerful indicators of SNM material. With the fast neutron multiplicity measurement technique, the measured count rate of two simultaneous fission neutrons is proportional to the square of the intrinsic detection efficiency. Thus, there is a premium on having intrinsic detection efficiency much higher than 4%. There is, therefore, a continuing need for fast neutron detection with both high intrinsic detection efficiency (>4%) and high gamma ray discrimination factor (>10,000:1 and preferably >100,000:1).

Similarly, there is a continuing need for thermal neutron detection with both high intrinsic detection efficiency (e.g., >5% and preferably >10%) and high gamma ray discrimination factor (e.g., >100,000:1 and preferably >1,000,000:1). To achieve high detection efficiency it is preferred to have a high concentration of a suitable isotope, such as Li-6 dissolved in the material. However, lithium forms polar compounds that are very poorly soluable (about (0.01% wt/wt) in non-polar scintillating plastics, such as polystyrene (PS) and polyvinyltoluene (PVT). Accordingly, a highly efficient, thermal neutron plastic scintillation detector has not yet been achieved.

Therefore, despite major efforts by Federal Agencies, National Laboratories and many researchers, there has been less progress than desired in meeting the fundamental objectives of improved neutron detection for the SNM Movement Detection Program. Accordingly, there is a need for a large area, fast and thermal neutron detector with high intrinsic efficiency and acceptable gamma discrimination.

BRIEF DESCRIPTION OF DRAWINGS

FIG. 3 is a schematic depiction of the PSHD process. The scintillation pulse shapes are shown for a gamma interaction and a fast neutron scatter in the polymeric material composition. As shown in FIG. 2, the effect of intra-dimer contact Triplet-Triplet Annihilation (TTA) leading to PHD is indicated. The shaded region shows the contribution to the light production from the inter-dimer Triplet-Triplet Annihilation (TTA) process between nearest neighbor dimers. This is the basis for Pulse Shape Discrimination (PSD).

DETAILED DISCLOSURE

Embodiments relate to an advanced fast and thermal neutron detector material composition with the properties useful for Special Nuclear Material (SNM) detection. Specific embodiments of the material composition result in two excimer scintillation light production mechanisms that provide two corresponding independent techniques for gamma discrimination; namely Pulse Shape Discrimination and Pulse Height Discrimination. A dual discrimination method, Pulse Shape and Pulse Height Discrimination (PSHD), can be implemented relying on both pulse height discrimination and pulse shape discrimination, and can allow the operation of large area, fast and thermal neutron detectors. In specific embodiments, the estimated fast neutron intrinsic detection efficiency is >20%, >25%, and/or >30%, and the gamma discrimination factor is >10,000:1, >50,000:1, >90,000:1, and/or >100,000:1. In specific embodiments, the estimated thermal neutron intrinsic detection efficiency is >10, >20, and/or >30%, and the gamma discrimination factor is >100,000:1, and/or >1,000,000:1.

Embodiments can incorporate dyes as excimer fluorescent sources of scintillation light. In specific embodiments, polycyclic aromatic fluors can be used. The selection of the dyes as excimer fluorescent sources of scintillation can be selected based on the properties of the polycyclic aromatic fluor's solubility, propensity to form dimers, absorption spectrum, excimer fluorescence spectrum, and monomer and dimer scintillation intensity and decay times.

Embodiments can incorporate dyes as singlet state sources of scintillation light. Standard primary scintillation dyes can be selected based on their solubility, absorption spectrum, fluorescence spectrum, scintillation intensity, degree of Stokes shift and decay times. Such dyes can be selected based on performances when they are dissolved in polystyrene (PS), polyvinyltoluene (PVT), polymethylmethacrylate (PMMA), and other amorphous polymers. A Bismuth electron source and Polonium alpha particle source can be used to initially evaluate such dyes. Such dyes can serve to provide a conventional measure of the energy loss in the plastic. Embodiments of the subject plastic scintillators can be fabricated of a polymer that contains:

a) 0.2, 0.4, 0.6, 0.8 and >1.0 mol/L of the selected dimer fluor; and b) 0.25, 0.5, 1.0, 2.0, 3.0 and >4.0% wt/wt of the primary dye.

The plastic scintillators can be bombarded with electrons and alpha particles, and pulse height and pulse shape measurements taken by sampling the scintillation pulses at 2 ns intervals over a total time of 200 ns.

Embodiments of the plastic scintillators can also be placed in a flux of fast neutrons from, for example, an Americium source and a Cesium gamma ray source, and pulse height and pulse shape measurements taken by sampling the scintillation pulses at 2 ns intervals over a total time of 200 ns. Values of gamma discrimination can be utilized in the selection of material composition. Various combinations of polymer and dimer fluor, and various concentrations of dimer fluor can be utilized. Further specific embodiments can be at least 8 inch by at least 1 inch in cross-section and at least 48 inches long.

Two Photo-Physical Mechanisms for Obtaining Two Independent Measurements of Gamma Discrimination Table 1 describes four developments with respect to the photo-physical mechanisms used in organic scintillators. Specific embodiments of the subject scintillation material can incorporate two photo-physical mechanisms for obtaining two independent measurements of gamma discrimination.

TABLE 1

The Four Milestones in Organic Scintillator Development.

| Item | Type of Organic Scintillator | Physical Mechanism for Prompt Scintillation Light Production | Pusle Shape Discrimination (PSD) from Delayed Emission | Pulse Height Discrimination (PHD) from normalized intra-dimer TTA | Fast Neutron Gamma Discrimination |
|---|---|---|---|---|---|
| 1 | Conventional Plastic Scintillator/ Pilot Chem. Co. (1950) | Molecular Singlet State Decay | — | — | — |

TABLE 1-continued

The Four Milestones in Organic Scintillator Development.

| Item | Type of Organic Scintillator | Physical Mechanism for Prompt Scintillation Light Production | Pusle Shape Discrimination (PSD) from Delayed Emission | Pulse Height Discrimination (PHD) from normalized intra-dimer TTA | Fast Neutron Gamma Discrimination |
|---|---|---|---|---|---|
| 2 | Conventional Liquid Scintillator/ (1949) | Molecular Singlet State Decay | Diffustion Controlled TTA*** Between Molecules | — | ≈$10^3$:1 Good for Small Detector |
| 3 | PSD* Plastic Scintillator/ Nanoptics, Inc. (2010) LLNL (2010) | Molecular Singlet State Decay | Inter Molecular TTA*** by Direct Energy Transfer via Electron Exchange | — | ≈$10^3$:1 Good for Small Detector |
| 4 | PSHD** Plastic Scintillator/ Nanoptics, Inc. (2012) | Excimer Singlet State Decay | Inter Dimer TTA*** by Direct Energy Transfer via Electron Exchange | Intra Dimer TTA*** by Contact Annihilation | Objective ≥105:1 Good for Large Detector |

*PSD—Pulse Shape Discrimination
**PSHD—Pulse Shape and Height Discrimination
***TTA—Triplet-Triplet Annihilation Item 1. Conventional plastic scintillators rely on harvesting the fluorescent radiation from the plastic and exciting a primary dye at a concentration of about 1% wt/wt into an excited singlet state. That state decays via prompt Forster fluorescence and produces scintillation light via a secondary dye. Any triplet states that are produced are immobile in the solid and slowly lose their energy by non-radiative transitions.

Item 2. Conventional liquid scintillators rely on producing the prompt scintillation light by the same singlet mechanism as described in item 1 above. The production rate of triplets depends on the ionization density along the track of the incident radiation. The triplet states diffuse through the liquid until they annihilate one another according to the process:

The Triplet-Triplet Annihilation (TTA) rate is controlled by the diffusion constant of the Triplet states in the liquid. In this way, delayed scintillation light is produced with intensity dependent on the nature of the incident particle. This is the physical basis of Pulse Shape Discrimination in a liquid. In the measurement of recoil protons from fast neutrons, the measured gamma ray discrimination factor is about $10^3$:1.

Item 3. In 2010, a material composition of solid plastic scintillator was made to give PSD with about the same discrimination as liquid scintillator. The physical mechanism was found by Nanoptics, Inc. to be Direct Energy Transfer via Electron Exchange (DETEE) between immobile triplet states in the solid material. The mechanism was used to design a scintillation material composition for the desired pulse shape structure. A group at Lawrence Liveintore National Laboratory (LLNL) has shown that the gamma discrimination is comparable to the $10^3$:1 found for liquid scintillator in Item 2, or in many organic crystals.

Item 4. In 2012, Nanoptics, Inc. taught the use of a solid plastic composition that employs the self-assembly of dyes into dimers. This material composition produces excimer scintillation light. Most importantly, there are two mechanisms that can provide independent measurements of Pulse Height Discrimination and Pulse Shape Discrimination. The two photo-physical mechanisms are 1) intra-dimer light production from excimer decay and TTA and 2) inter-dimer TTA. An advantage of this technique is having two independent measurements of gamma discrimination. Because the inter-dimer TTA mechanism to produce PSD is the same mechanism, namely DETEE, as used in Item 3, embodiments can provide a similar gamma discrimination factor, namely about $10^3$:1. The intra-dimer mechanism to produce PHD can, in specific embodiments, provide a gamma discrimination of >100:1 and >1000:1. The combination of gamma discrimination factors from these two independent mechanisms can, in specific embodiments, provide a total gamma discrimination of >$10^5$:1 and >$10^6$:1. This powerful discrimination allows the scintillating material of specific embodiments of the subject detector to operate reliably as a large area detector.

When the polymeric material is made to contain elements with large thermal neutron capture cross-sections, the nuclear fragments resulting from capture can be detected by their scintillation. Importantly, the high ionization density of these fragments can be detected by the same PSHD physical mechanism as described above for the recoil protons from neutron scattering.

Material COmposition and Photo-Physics

Specific embodiments can have high concentration of a polycyclic aromatic fluorescent compound, such as pyrene, dissolved in a monomer and the solution can then be polymerized. Plastics such as polystyrene and polyvinyltoluene (Tymianski and Walker, U.S. Pat. No. 5,606,638) have been taught and the identification and description of such plastics, which can be utilized in various embodiments of the subject invention, is hereby incorporated by reference in its entirety. The fluor utilized with specific embodiments is selected to self-assemble into dimers at concentrations greater than about 0.2 mol/L. A dimer is a pair of fluors that form a weakly bound co-planar state in which the two rigid planar molecules are parallel to each other. Their separation is typically 3 to 4 Angstroms.

Intra-Dimer Light Production

There are two processes which produce intra-dimer light.

Process One

Various embodiments can utilize the first process for intra-dimer light production. A low energy proton recoiling from a neutron scatter, nuclear fragments from a capture event, or an electron recoiling from a gamma ray scatter all have different probabilities to excite or ionize one pyrene molecule in the dimer. That process can result in the dimer being in an excited singlet state, termed an excimer. Excimer decay produces prompt excimer radiation with a large Stokes shifted scintillation pulse of maximum intensity at 480 nm and decay time of 40 to 65 nanoseconds. This prompt emission is the first source of excimer scintillation light and it is produced by protons, nuclear fragments, and electrons.

Process Two

Figure 1:
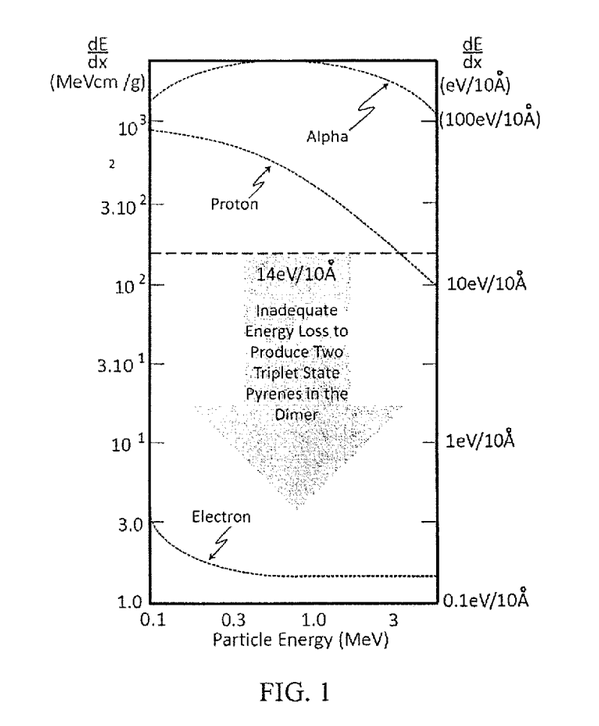
FIG. 1 shows specific ionization energy loss vs. particle energy.

Various embodiments can utilize a second process, either in conjunction with the first process described above or alone. The second process for intra-dimer light production involves excimer scintillation light from a single dimer. This process is primarily activated by highly ionizing particles. The ionizing density can be calculated using a modified Bethe formula (Radiation Detection and Measurement, P32, by Glenn F. Noll, Wiley) using the ESTAR program available from NIST. The result is shown in FIG. 1.

In the relevant energy range 0.3 to 3 MeV, the proton (nuclear fragments) has a 100 (>100) higher specific ionization (dE/dx) compared to the electron. This much higher energy loss per unit distance provides the proton (nuclear fragments), compared to an electron, more than 10,000 times higher probability of ionizing both pyrene molecules in the dimer. It can be seen in FIG. 1 that the average ionization energy loss by the proton (nuclear fragment) along a distance characterized by the dimension (10 A) of a dimer is >twice the ionization energy, 7 eV, of pyrene. A horizontal line is plotted at 14 eV in FIG. 1, which is the minimum necessary energy loss to ionize both pyrene molecules in the dimer. However, electrons will essentially never ionize both pyrene molecules in the dimer. An ionized pyrene molecule will rapidly attract a free electron from the plastic matrix environment, and the molecule will cascade down to the lowest energy level, singlet or triplet. For statistical reasons, a large fraction of ionization interactions will result in a pair of triplet states being formed in the dimer. Due to the physical intimacy of the triplets, the Triplet-Triplet Annihilation (TTA) process occurs with a large rate constant and results in a TTA process within 1 ns. That process leads to an excited singlet state pyrene (an excimer) and a ground state pyrene: $T_1+T_1 \rightarrow S_1+S_0$.

The excimer decays by scintillation light emission as described above. This excimer emission through the process of TTA is termed delayed emission. However, the delay in this instance is very short, 1 ns, and is therefore virtually indistinguishable from the prompt emission described above in process one. From an operational point of view, both the prompt emission and this form of delayed emission occur nearly simultaneously. For this reason we refer to this light as "prompt" emission. This second source of excimer scintillation light is efficiently produced by protons and nuclear fragments, and essentially not at all by electrons.

Accordingly, for intra-dimer scintillation light, recoil protons and nuclear fragments have two routes to producing excimer scintillation as compared to only one route for electrons. The light has a characteristic 40 to 65 ns decay time.

This effect appears to have been observed before. J. B. Birks (Chemical Physics Letters Vol. 4, No. 10, 1970) described a dramatic increase in the prompt excimer scintillation light from dimers of several aromatic compounds relative to monomer emission as the density of ionization was increased. A variable intensity electron beam was employed to increase the ionization density. That result is most simply, if not uniquely, interpreted as due to the ionization dependent intra-dimer TTA mechanism.

This is the fundamental photo-physical basis for the PHD mechanism.

Method to Normalize the Intra-Dimer Scintillation Light Intensities

To take account of the different possible energy depositions by each particle, the excimer scintillation pulse height from the subject plastic material composition can be normalized. An independent scintillation fluor mechanism, which is not based on the dimer/excimer process, can be used to measure the conventional scintillation intensity with a 2 nanosecond decay time constant. This conventional excited singlet state scintillation mechanism is designed to minimally exchange energy with the excimer light production process. A primary dye at a conventional concentration of, for example, 1% wt/wt, will receive energy from the PVT via the Forster process and emit scintillation light through singlet decay. The primary dye can be selected to have a large enough Stokes shift that no secondary dye is required. For this reason, little of this light will be diverted into the excimer process. This independent light production can be referred to as "Normal Scintillation Light" (NSL), as distinct from the "Excimer Scintillation Light" (ESL). The time dependent pulse shapes are shown schematically in FIG. 2 for specific embodiments.

Figure 2:
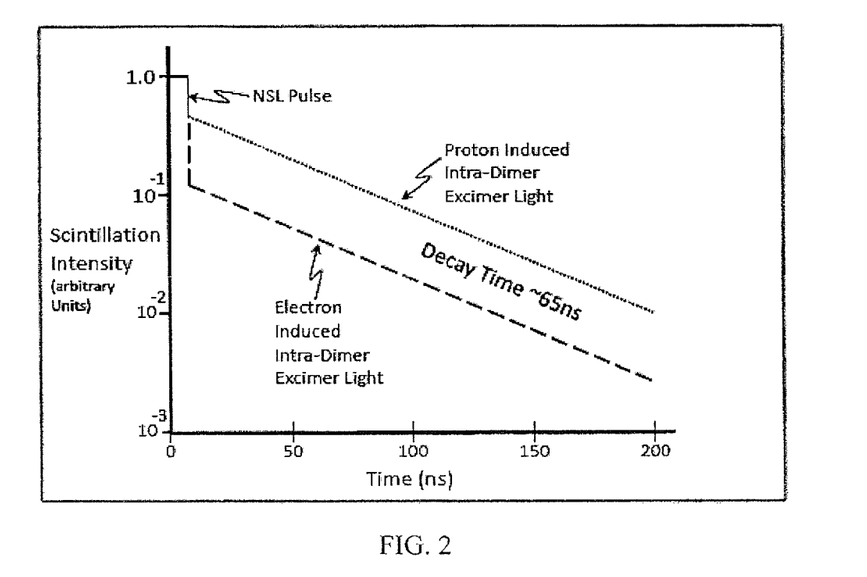
FIG. 2 is a schematic depiction of the PHD process. The scintillation pulse shapes are shown for a gamma interaction and a fast neutron scatter in the polymeric material composition. The heights of the two corresponding NSL pulses have been normalized for ease of comparison. The recoil proton produces more light at all times compared to the recoil electron. This is due to the proton, unlike the electron, having an adequate ionization density to frequently produce two triplet states in a given dimer in the plastic. This permits intra-dimer contact Triplet-Triplet Annihilation (TTA) within one nanosecond, which results in essentially prompt emission of excimer light. This is the basis for Pulse Height Discrimination (PHD).

The scintillation pulse for each event is normalized to a fixed height of the NSL pulse as shown in FIG. 2. In this context, it is to be understood that the height of the NSL pulse is defined as the height of the measured NSL pulse after subtraction of the average height of the Excimer pulse under the NSL pulse. The difference in normalized excimer scintillation pulse height is used to distinguish interactions produced by neutrons from those produced by gamma rays. The amount of extra scintillation light for protons (nuclear fragments) compared to electrons is a function of the proton (nuclear fragment) energy. However, in specific embodiments, there is at least a factor of 2 more excimer light from heavily ionizing particles compared to electrons after the normalization process has been made. This form of discrimination against gamma rays is referred to as Pulse Height Discrimination (PHD). Discrimination can be quantitatively obtained by on-line analysis or off-line analysis as described later.

Inter-Dimer Light Production

Figure 3:
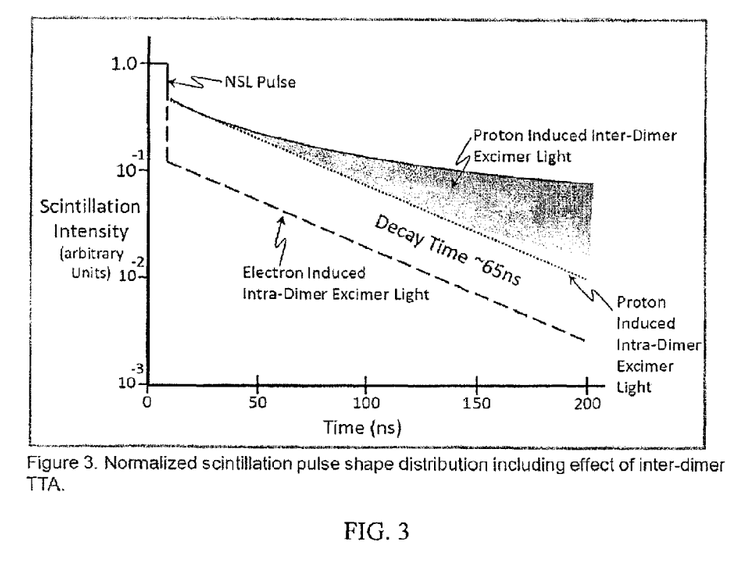

Beyond the intra-dimer triplet-triplet annihilation process discussed above, inter-dimer triplet-triplet annihilation will occur because of the high pyrene concentrations employed in the material incorporated in specific embodiments. In specific embodiments, the mean distance between dimers is in the range 10 to 15 Angstroms. At large transverse distance from the proton (nuclear fragment) track, the ionization density will reduce and no longer be adequate to ionize both pyrene molecules in a dimer. At that radius, most recoil protons (nuclear fragments) will produce excimers that contain only one ionized pyrene molecule. Three times out of four these states will be triplets. These triplet states will only rarely give rise to scintillation light via spin forbidden intersystem crossing transitions to the ground state. However, these triplet states can give rise to delayed excimer scintillation light via inter-dimer triplet-triplet annihilation (TTA). In the solid polymer matrix, this process occurs by Direct Energy Transfer by Electron Exchange (DETEE) as described, and demonstrated experimentally with alpha particles, U.S. Patent Application Pub. No.: US 2012/0241630 and PCT Patent Application No.: PCT/US2012/045094, published Jan. 3, 2013 under publication number WO 2013/003802, all of which are hereby incorporated herein by reference in their entirety. Also, this mechanism was experimentally demonstrated using neutrons and gamma rays by N. Zaitseva et al., Nuclear Instruments and Methods in Physics Research A 668 (2012) 88-93; and International Application No.: PCT/US2012/033449, which are hereby incorporated herein by reference. The net effect of the inter-dimer DETEE physical mechanism is to produce delayed scintillation light. The decay time of the delayed light is calculable and controllable by the dimer concentration as described by the DETEE mechanism. The results are similar to the diffusion controlled process underlying PSD in liquid scintillator. The expected scintillation pulse shape for heavily ionizing recoil protons (nuclear fragments) is illustrated in FIG. 3. FIG. 3 illustrates the difference in pulse shapes of recoil protons (nuclear fragments) and electrons.

Summary of the PSHD Photo-Physical Mechanisms in Plastic Scintillators

Embodiments of the subject method utilize both PSD and PHD for achieving superior gamma discrimination, which can be referred to as the "PSHD" method. The two major results of considering both photo-physical mechanisms associated with the use of dimers in the PSHD method are:
1. Increased proton (nuclear fragment) pulse height at all decay times from the intra-dimer TTA mechanism. This light is unique to the use of dimers in the plastic. This is the basis for the PHD mechanism.
2. The increased delayed scintillation intensity from the inter-dimer TTA mechanism; which is the basis for the PSD mechanism.

An advantage of the PSHD method is the use of two independent mechanisms, rather than the current approach of using the single PSD mechanism of measuring TTA. In specific embodiments, this is achieved by the use of two dye molecules that self-assemble in the form of dimers and create the intra-dimer TTA process.

In one embodiment of the invention the polymeric matrix can be cross-linked. This process confers greater mechanical and thermal integrity to the scintillating plastic product.

Fast Neutron Scatter Detection and Gamma Discrimination

Embodiments of the subject PSHD method can use the discrimination present in the large pulse heights in the short time region due to the PHD mechanism as well as the increased intensity in the delayed pulse tail region due to the PSD mechanism. Preferably, specific embodiments will provide a gamma discrimination using the PHD mechanism of at least 50:1, at least 100:1, at least 200:1, and/or at least 300:1 and provide a gamma discrimination using the PSD mechanism of at least 50:1, at least 100:1, at least 200:1, and/or at least 300:1.

In a specific embodiment utilizing the independent photo-physical mechanisms (PHD and PSD) with a scintillating plastic material, such as a scintillating plastic material described herein, can provide a total gamma discrimination of at least 1000:1, at least 10,000:1 and at least 100,000:1.

Various embodiments of the invention can utilize a variety of dyes as excimer fluorescent sources of scintillation light.

In the 1960s and 1970s it was found that self assembly of dimers and excimer formation occurs in a wide variety of condensed polycyclic hydrocarbons. Dyes which can be utilized in embodiments of the subject detector include, but are not limited to:
1) Anthracene and its alkyl derivatives
2) Pyrene and its derivatives
3) 1,2-benzanthracene and its derivatives
4) Tetracene
5) 3,4-benzophenanthrene and its derivatives and
6) Triphenylene.

Specific PAH compounds can be selected based on their solubility, propensity to form dimers, absorption spectrum, excimer fluorescence spectrum, and monomer and dimer fluorescence or scintillation intensity and decay times, when they are dissolved in organic solvents, such as polystyrene (PS), polyvinyltoluene (PVT), or other amorphous polymers. In addition, commercial availability, price, and ease of purification are among other factors that can be taken into account. Scintillation development work with pyrene was taught in U.S. Pat. No. 5,606,638, and is incorporated herein in its entirety. Pulse height and shape information can be obtained using a commercial 500 MHz sampling pulse information system, such as the Acquiris system from Agilent. Electronics and data analysis system can also be used to collect the needed data.

Various embodiments can utilize dyes as singlet state sources of scintillation light for the purposes of determining normalization (NSL) of the excimer pulse heights. Standard primary scintillation dyes can be selected based on their solubility, absorption spectrum, fluorescence spectrum, large Stokes shift, scintillation intensity, and decay times when they are dissolved in polystyrene and polyvinyltoluene. Dyes that can be used include the class of compounds described in "Organic Scintillators with Unusually Large Stokes' Shifts", Gusten, H. and W. Seitz, J. Phys. Chem. 82:459-463 (1978), which is hereby incorporated by reference in its entirety. Two of these dyes are shown in Table 2. Such dyes have decay times in the range 1 to 2 ns.

TABLE 2

Three Large Stokes' Shift Primary Dies

| Primary Dye | Molar Mass g mol$^{-1}$ | Maxima * Absorption nm | Emission nm | Light Yield * (arbitrary units relative to each other) |
|---|---|---|---|---|
| PMP-420 | 264 | 302 | 414 | 100 |
| PMP-440 | 296 | 307 | 428 | 97 |
| 3-HF | 238 | 338 | 528 | 20 |

* These spectral properties and light output have been measured in polystyrene.

Figure 4:
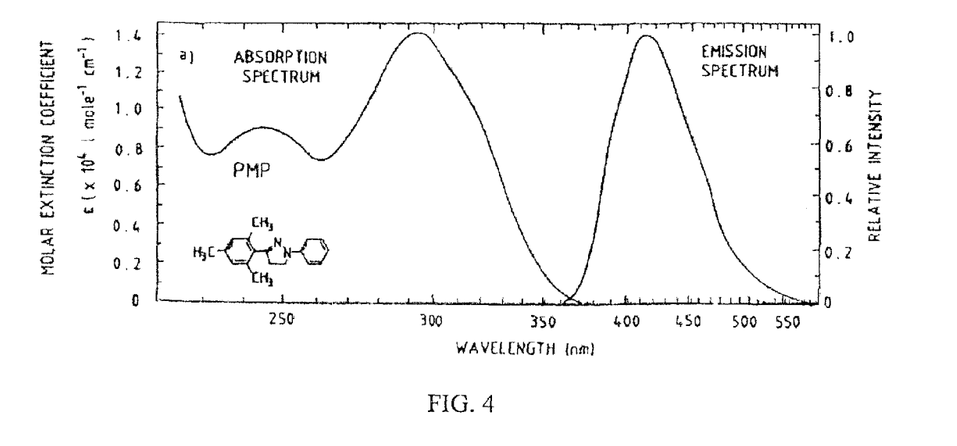
FIG. 4 shows the absorption and fluorescence spectra of PMP and POPOP in cyclohexane at room temperature.

The light yield is seen to be much higher than with the conventional large Stokes' shift dye, 3-HF. The absorption and emission spectra for PMP-420 are shown in FIG. 4.

The large Stokes shift of the PMP dyes is acquired by steric hindrance produced by two methyl groups. The quantum efficiency of the PMP-420 dye is 0.9. Importantly, the emission spectra peak of polystyrene and polyvinyltoluene are at 332 nm and 312 respectively and have good overlap with the absorption spectrum of PMP-420. Scintillating plastic fibers with the single dye PMP-420 have been successfully used at the Large Hadron Collider, CERN, Geneva for several years and performed well in a high radiation environment "Particle Tracking with Scintillating Fibers", D'Ambrosio, C. et al., IEEE Transactions on Nuclear Science, Vol. 43, No. 3, June 1996. Thus, the use of a single dye for producing stable, bright scintillation light with little reabsorption has been well established. This scintillation mechanism is based on singlet state decay of the PMP-420.

In some embodiments of the invention, there is little spectral overlap of the scintillation emission from the excimer and NSL light sources. In this case, two separate photo-sensitive detectors with different and appropriate spectral sensitivities can be used to readout the two sources of scintillation light. This technique obviates the necessity of high bandwidth waveform electronic digitizers.

In a specific embodiment, where a non-aromatic polymer such as PMMA is used, PMP-420 can be used at higher concentration to produce adequate scintillation light intensity. For this purpose, concentrations of 2% to 6% wt/wt may be used. There is a very small concentration quenching of the emitted light due to the large Stokes shift.

Figure 5:
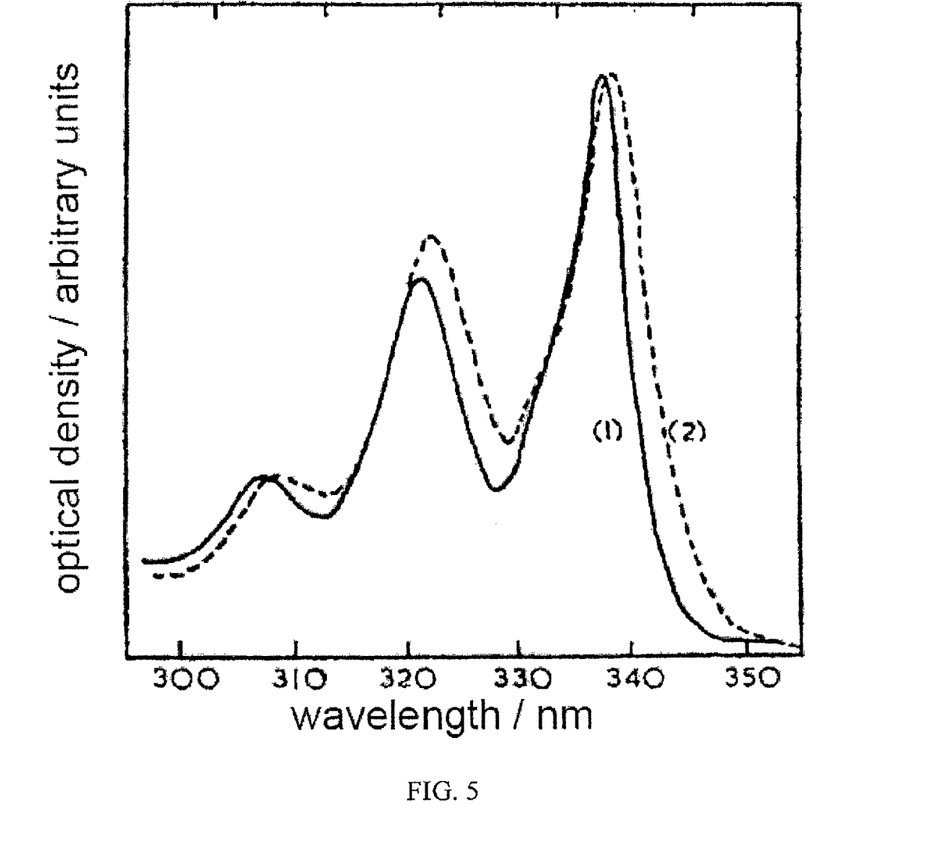
FIG. 5 shows a comparison of the absorption spectra for two concentrations of Pyrene in PMMA, (1) $10^{-2}$ mol dm$^{-3}$ and (2) 1 mol dm$^{-3}$.

In specific embodiments, it is important that the emission spectrum of the PMP does not overlap with the absorption spectrum of Pyrene. The latter spectrum has been measured in polymethylmethacrylate at high concentrations of at least 1 mol/L. The absorption spectrum is shown in FIG. 5. The dye spectra are dependent on the polarity of the matrix polymer. However, these differences are quite small compared to the effects of interest in this application.

It can be seen that the pyrene absorption is essentially zero at wavelengths above 350 nm. Since the PMP emission starts at 360 nm, this demonstrates that there is negligible transfer of energy from the PMP-420 singlet emission into the pyrene system. Conversely, the pyrene excimer emission starts at 400 nm and peaks at 480 nm. Therefore, no light from the pyrene can be absorbed by the PMP-420 dye whose absorption is zero above 370 nm.

Thermal Neutron Detection Using a Plastic Scintillator Employing PSHD

In another embodiment of the invention, the plastic scintillator described supra, that provides PSHD can be used to detect thermal neutrons with gamma discrimination factor of at least 100,000:1 and preferably >1,000,000:1.

The thermal neutron may be generated by a fast neutron incident on the plastic that suffers multiple scatters in the plastic, each of which degrades the energy of the fast neutron. Such an event can be detected by what appears to be a single recoil proton event (due to the short time between two or more scatters) by employing PSHD, followed by a neutron capture event occurring usually at least a few hundred nanoseconds later.

Alternatively, the thermal neutrons may have been thermalized external to the plastic and subsequently incident on the plastic where it is captured.

The neutron capture process in the plastic can employ the well-known use of $^{10}B$ or $^{6}Li$ in the plastic. These two nuclei have large cross-sections for absorption of thermal neutrons with the production of highly ionizing nuclear fragments such as an alpha particle, a lithium nucleus, or a triton. The specific ionization of these particles is greater than that of a recoil proton, as can be seen in FIG. 1. As a result, the use of PSHD is even more effective for providing large gamma discrimination for identifying thermal neutrons than it is for identifying fast neutrons.

The use of covalently bonded boron compounds dissolved in polymers is well known, and there are commercial plastic scintillators available from ELJEN and BICRON. Because these plastics do not provide significant gamma discrimination, they have found very limited applicability. However, the use of several percent wt/wt of boron in a plastic, in accordance with specific embodiments of the subject invention, can offer very effective PSHD and create an excellent thermal neutron detector. Such plastic can be formed into fiber and can be used as a high spatial resolution thermal neutron detector with high gamma discrimination.

The use of lithium compounds, such as lithium chloride and lithium nitrate, in plastic is difficult due to the highly polar nature of lithium compounds. The compounds can exist in ionic form and are rather insoluble in a non-polar matrix. In the non-polar plastics such as PS and PVT it is possible to achieve lithium ion concentrations of up to about 0.01% wt/wt. This low concentration of lithium can severely limit the sensitivity of thermal neutron capture by lithium in these plastics. However, if 10 cm or more thickness of plastic scintillator is required to detect fast neutrons, the plastic can contain enough $^{6}Li$ to offer acceptable thermal neutron detection in some embodiments of the invention.

Embodiments of the invention utilize amorphous polar polymers that are transparent and can dissolve polar compounds to a significant concentration. These polymers include, for example, PMMA, and polyvinylpyrrolidone. Embodiments using moderately polar PMMA as the plastic matrix can achieve concentration of lithium compound greater than 0.01% wt/wt, greater than 0.05% wt/wt, in the range of 0.01% wt/wt to 0.05% wt/wt in the range 0.05 to 0.1% wt/wt, and/or greater than 0.1% wt/wt and preferably, also achieved up to 15% wt/wt of pyrene, and up to 3% wt/wt of PMP-420 providing normalization information. In addition, an aromatic solvent, such as pseudocumene, can be dissolved to increase the light output. To provide adequate structural integriy the material is preferably cross-linked. Embodiments utilizing such a plastic scintillator can provide a good thermal neutron detector. A plastic scintillator with such a composition can offer good fast neutron detection coupled with effective thermal neutron capture.

Embodiments utilizing PSHD for the fast neutron detection event and PSHD for the delayed neutron capture event can provide a gamma discrimination of at least one billion to one. This type of neutron detection is referred to "neutron capture gated".

Further embodiments of the invention utilize a soluble, non-polar aggregate of organolithium compounds. Such compounds include n-butyl lithium, hexyllithium, lithium phenoxide, and hundreds of other such compounds. These compounds self-assemble in solution as dimers, trimmers, tetramers, and oligomers. T. S. DeVries, et al., *Journal of the ACS*, 2009, 131, 13142-13154. By forming these higher order species, the overall polarity of the entity is drastically reduced and they become soluble in the non-polar monomer solvent. Remaining insoluble salt crystallites precipitate, and can be removed by filtering. Lithium solubility in solution can be determined by conventional NMR spectroscopy. In the case of n-butyl lithium, solubility was achieved such that the lithium concentration was at least 0.1% wt/wt.

Figure 6:
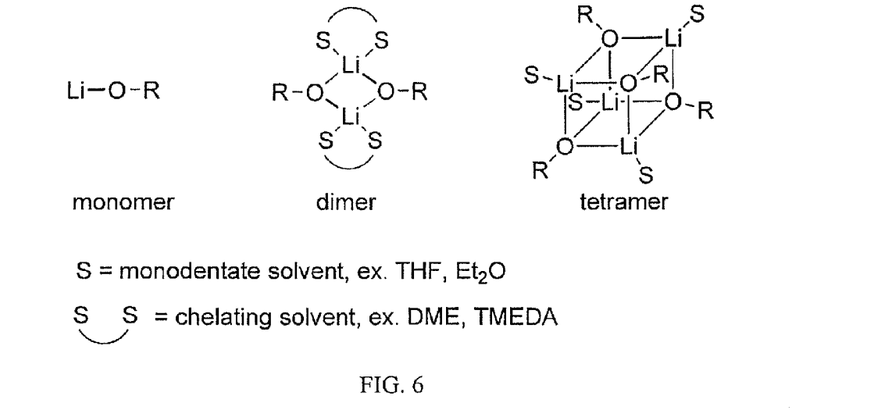
FIG. 6 shows multinuclear forms of organolithium compounds as a function of solvent.

Another embodiment of the invention utilizes a organolithium compound being dissolved in a polar solvent. In order to achieve higher lithium solubility, a solvent, such as tetrahydrofuran (THF), dimethoxyethane (DME) and tetramethylethylenediamine (TMEDA), can be used as an initial solvent for the organolithium compound. A molecule of the solvent can occupy one or more of the coordination sites of lithium, thus reducing the degree of nuclearity of the aggregate, as shown in FIG. 6. The solvent is removed and the reformed solid is lightly dried to ensure retention of the donor solvent molecules. That non-polar solid is then easily dissolved in the non-polar styrene and can provide at least, and/or greater than, 0.1% wt/wt of lithium in the final polymerized plastic scintillator.

Figure 7:
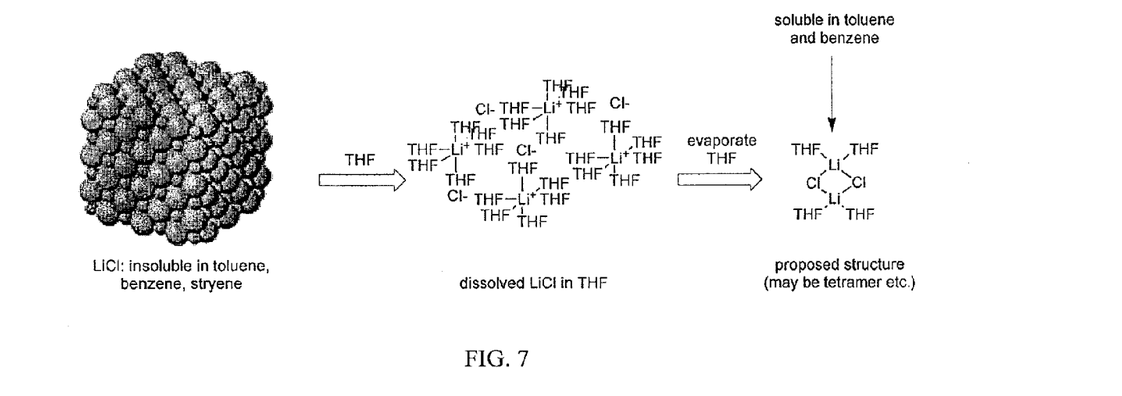
FIG. 7 shows schematically the process for converting insoluble crystalline LiCl into solvated LiCl.

Another embodiment of the invention utilizes the principles of self-assembling soluble dimer, trimer, and tetramer lithium species of simple lithium salts of the form LiX, including but not limited to, LiOH, LiCl, LiF, and LiClO$_4$. These salts are not soluble in styrene and result in submicron crystallites. In this case, the extended inorganic polymeric salt is converted into discrete molecular units, as shown in FIG. 7, by dissolving the salt in a polar solvent, such as THF. The donor molecule satisfies the coordination sphere of the lithium ion and the counter-ion is separated from the lithium ion. There is a resulting large drop in polarity, which allows the entity to be soluble in styrene. In practice, the compound LiX is dissolved in a polar solvent, such as THF, DME, or TMEDA, and discrete species of aggregates form, as shown in FIG. 7. The solvent is removed to reform a solid that is not dried excessively. In this case, the coordinated solvent is retained and the solid, shown on the right hand side of FIG. 7, is found to be soluble to at least 3.6% wt/wt in styrene. This solubility provides a lithium concentration of at least 0.1% wt/wt in the scintillating plastic after polymerization.

Fast Neutron Detection Using a Liquid Scintillator Employing PSHD

In another embodiment of the invention, fast neutrons are detected using a liquid solvent scintillation matrix. A polycyclic aromatic dye can be used to provide self-assembled dimers as described supra in plastic materials. The normalization of the energy loss can be performed, as with a solid scintillator, using a dye such as PMP-420. The effectiveness of PSHD in liquid and solid polymers is similar. Consequently, similar neutron detection sensitivity and gamma discrimination can be obtained in a liquid matrix as in a solid plastic matrix.

Thermal Neutron Detection Using a Liquid Scintillator Employing PSHD

In another embodiment of the invention, thermal neutrons are detected using a liquid solvent scintillation matrix. The thermal neutron capture process in the liquid can use, for example, $^{10}$B or $^6$Li in the liquid. A polycyclic aromatic dye is used to provide self-assembled dimers as described supra in plastic materials. The normalization of the energy loss is performed, as with a solid scintillator, using a dye such as PMP-420. The effectiveness of PSHD for gamma discrimination in liquid and solid polymer is similar. Consequently, similar gamma discrimination can be obtained in a liquid matrix as in a solid plastic matrix. In the case of the use of highly polar liquids, which include, but are not limited to, N-Methylpyrrolidone, Dimethylsulphoxide, and 1,3-Dimethyl 2-Imidazolidone, we have achieved concentrations of $^6$Li up to 1% wt/wt. Relatively short mean free paths (e.g., in the range of 1 to 2 cm) for thermal neutrons can be obtained. These liquids can be made into a gel by using 5 to 20% wt/wt of a very high molecular weight of the corresponding polymer such as polyvinylpyrrolidone in N-Methylpyrrolidone. When such a polymer is lightly cross-linked it can form a solid gel which retains shape and cannot be poured. In some embodiments of the invention, this is an important safety feature of the detection system.

Method and Measurements of Pulse Shape and Height Discrimination (PSHD)

In an embodiment of the subject invention, the combination of these unique pulse shape and pulse height characteristics are measured in-line by a high bandwidth waveform digitizer. The data is sent to a processor and analyzed on-line with algorithms to provide optimum discrimination against gamma ray interaction in the scintillating material composition. The results from the data analysis can permit distinguishing a fast neutron scatter or neutron capture process in the material from a gamma ray interaction. Gamma discrimination ratios of greater than 100,000 to 1 can be achieved.

In another embodiment of the invention, the integrated charge within a small number of time windows during the pulse can be measured and compared with one another on-line. This is a more economical approach to performing PSHD and is appropriate in some embodiments of the invention.

Aspects of the invention, such as measuring the data for the PHD and PSD, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient, removable and non-removable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A scintillation system for detecting incident penetrating radiation, comprising:
a scintillator composition for converting the incident radiation to visible light,
wherein the scintillator composition comprises:
a matrix material,
wherein the matrix material has one or more types of chromophore dyes that self-assemble to form weakly bonded dimeric chromophores dissolved in the matrix material,
wherein the matrix material contains dimeric chromophores at a concentration such that the dimeric chromophores have an average nearest neighbor distance in the range 5 to 12 Angstroms,
wherein the one or more dimeric chromophores produce prompt excimer scintillation light with a decay time constant in the range 5 to 100 ns,
wherein the one or more dimeric chromophores produce essentially prompt excimer scintillation light, where the essentially prompt excimer scintillation light is delayed excimer scintillation light with a delay in the range 0.3 to 3 ns relative to the prompt excimer scintillation light,
wherein the intensity of the essentially prompt excimer scintillation light is dependent on a specific ionization density of ionizing radiation,
wherein a pulse height of the essentially prompt excimer scintillation light is dependent on the specific ionization density of the ionizing radiation,
wherein the matrix material produces delayed excimer scintillation light, at a later time in the range 20 to 200 ns, as a result of interaction between nearest neighbor dimeric chromophores, and
wherein the delayed excimer scintillation light changes a pulse shape of a combined light pulse, where the combined light pulse incorporates the prompt excimer scintillation light, the essentially prompt excimer scintillation light, and the delayed scintillation light,
wherein the change in the pulse shape of the combined light pulse is dependent on the specific ionization density of the ionizing radiation, and
wherein the pulse height and pulse shape provide independent information on an ionization density of the ionizing radiation.

2. The system according to claim 1,
wherein the one or more chromophore dyes comprises one or more single molecule chromophore dyes,
wherein the one or more single molecule chromophore dyes do not form dimeric states,
wherein decay of excited singlet states of the one or more single molecule chromophore dyes provides a normalization scintillation light intensity that is independent of the excimer scintillation light, and
wherein the normalization scintillation light has a decay time constant less than 3 ns.

3. A method of detecting incident penetrating radiation, comprising:
providing a scintillation system according to claim 2;
exposing the scintillation composition to radiation;
receiving scintillation light from the scintillation composition; and
using the scintillation light from the scintillation composition to detect the incident radiation.

4. The system according to claim 1,
wherein the one or more chromophore dyes comprises dimeric chromophores and single molecule chromophores, and
wherein a light intensity of scintillation light from the dimeric chromophores having a decay time constant in the range of 5-100 ns can be distinguished from a light intensity of scintillation light from the single molecule chromophore having a decay time constant less than 3 ns.

5. A method of detecting incident penetrating radiation, comprising:
providing a scintillation system according to claim 4;
exposing the scintillation composition to radiation;
receiving scintillation light from the scintillation composition; and
using the scintillation light from the scintillation composition to detect the incident radiation.

6. The system according to claim 1,
wherein the system provides information to identify recoil protons over a range of energies from fast neutron scatters in the matrix material and discriminate with a factor of at least 10,000:1 against electron recoils from gamma ray scatters in the matrix material.

7. The system according to claim 1,
where the factor is at least 100,000:1.

8. The system according to claim 1,
where the system is adapted to detect incident penetrating fast neutrons.

9. A method of detecting incident penetrating radiation, comprising:
providing a scintillation system according to claim 8;
exposing the scintillation composition to radiation;
receiving scintillation light from the scintillation composition; and
using the scintillation light from the scintillation composition to detect the incident radiation.

10. The system according to claim 1,
wherein the matrix material comprises lithium.

11. The system according to claim 10,
wherein the matrix material comprises isotope Li-6 at a concentration greater than 0.01% wt/wt of the matrix material.

12. The system according to claim 11,
wherein the system provides information for identifying nuclear fragments resulting from thermal neutron capture by isotope Li-6 and discriminate with a factor of at least 100,000:1 against electron recoils from gamma ray scatters in the matrix material.

13. The system according to claim 12,
wherein the factor is at least 1,000,000:1.

14. The system according to claim 12,
wherein the factor is at least 10,000,000:1.

15. A method of detecting incident penetrating radiation, comprising:
providing a scintillation system according to claim 11;
exposing the scintillation composition to radiation;
receiving scintillation light from the scintillation composition; and
using the scintillation light from the scintillation composition to detect the incident radiation.

16. The system according to claim 10,
wherein the concentration of isotope Li-6 is greater than 0.05% wt/wt.

17. The system according to claim 10,
wherein the concentration of isotope Li-6 is greater than 0.1% wt/wt.

18. The system according to claim 10,
wherein the concentration of isotope Li-6 is greater than 0.2% wt/wt.

19. A method of detecting incident penetrating radiation, comprising:
providing a scintillation system according to claim 1;
exposing the scintillation composition to radiation;
receiving scintillation light from the scintillation composition; and
using the scintillation light from the scintillation composition to detect the incident radiation.

20. A scintillation system,
wherein the system provides normalized pulse height and pulse shape information for each event in which an excimer light intensity is divided by a corresponding normalization light intensity.

* * * * *